US008365225B2

(12) United States Patent
McCarthy et al.

(10) Patent No.: US 8,365,225 B2
(45) Date of Patent: Jan. 29, 2013

(54) PERSONALIZED MEDIA CHANNEL

(75) Inventors: Mary C. McCarthy, San Antonio, TX (US); Roland Noll, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1080 days.

(21) Appl. No.: 12/016,854

(22) Filed: Jan. 18, 2008

(65) Prior Publication Data
US 2009/0187943 A1 Jul. 23, 2009

(51) Int. Cl.
*H04N 7/025* (2006.01)
(52) U.S. Cl. .......... 725/46; 725/34; 725/47; 725/86
(58) Field of Classification Search .......... 725/45–49, 725/50, 34, 61
See application file for complete search history.

(56) References Cited

U.S. PATENT DOCUMENTS

| | | | | |
|---|---|---|---|---|
| 7,131,134 | B2* | 10/2006 | Trovato et al. | 725/46 |
| 7,188,355 | B1* | 3/2007 | Prokopenko et al. | 725/46 |
| 7,814,144 | B2* | 10/2010 | Koyama et al. | 709/203 |
| 2002/0056086 | A1 | 5/2002 | Yuen | |
| 2002/0092026 | A1 | 7/2002 | Janniello et al. | |
| 2002/0144267 | A1* | 10/2002 | Gutta et al. | 725/46 |
| 2002/0178448 | A1* | 11/2002 | Te Kiefte et al. | 725/46 |
| 2003/0067554 | A1* | 4/2003 | Klarfeld et al. | 348/461 |
| 2003/0101449 | A1 | 5/2003 | Bentolila et al. | |
| 2003/0101451 | A1 | 5/2003 | Bentolila et al. | |
| 2003/0163817 | A1 | 8/2003 | Han | |
| 2004/0019908 | A1 | 1/2004 | Williams et al. | |
| 2005/0084082 | A1 | 4/2005 | Horvitz et al. | |
| 2005/0120368 | A1 | 6/2005 | Goronzy et al. | |
| 2005/0160462 | A1* | 7/2005 | Shikata et al. | 725/58 |
| 2006/0004622 | A1 | 1/2006 | Fanelli et al. | |
| 2006/0095938 | A1 | 5/2006 | Joo | |
| 2006/0212900 | A1* | 9/2006 | Ismail et al. | 725/34 |
| 2007/0093263 | A1 | 4/2007 | Song et al. | |
| 2007/0094682 | A1 | 4/2007 | Kim et al. | |
| 2008/0115168 | A1* | 5/2008 | Adwankar et al. | 725/46 |
| 2009/0113472 | A1* | 4/2009 | Sheth et al. | 725/34 |
| 2009/0178081 | A1* | 7/2009 | Goldenberg et al. | 725/46 |

\* cited by examiner

*Primary Examiner* — Pankaj Kumar
*Assistant Examiner* — Timothy Newlin
(74) *Attorney, Agent, or Firm* — Jackson Walker L.L.P.

(57) ABSTRACT

A multimedia processing device (MPD) includes a relevance engine that is adapted to track a user's viewing preferences over time and to automatically determine which of the programs available in a given time slot is most probably preferred by that user. The relevance engine can then create a sequential play list, with each entry in the list corresponding to the program the user most likely wants to watch at that time. The user can thus be provided with a personalized multimedia channel (PMC) with the play list providing the program for each time slot. The user may be enabled to "tune" to the PMC like any other channel. When the user "tunes" to the PMC, the MPD will take the appropriate action to display the program selected by the PMC.

28 Claims, 6 Drawing Sheets

PERSONALIZED MEDIA CHANNEL

BACKGROUND

1. Field of the Disclosure

The present disclosure relates to multimedia programming and more particularly to multimedia content distribution networks.

2. Description of the Related Art

Some services for delivering television and other multimedia content, including cable, digital cable, satellite, and internet protocol television (IPTV) services, provide an electronic programming guide (EPG). An EPG is a graphical display of the programs provided on each station during indicated time intervals. An EPG allows users to see what programs are available.

DESCRIPTION OF THE EMBODIMENT(S)

A user of modern television programming packages may receive the programming via a number of delivery mechanisms, including standard cable, digital cable, satellite, or IPTV. When users have access to an EPG, they may be presented with a number of programming options for any given time slot. Depending on the programming package, the number of programming options may vary from only a handful of channels to hundreds of channels or more. When users select programs, they create evidence of their preferences for selected programs over the other available programs.

In one aspect, a disclosed media processing device (MPD), which may be implemented as a set top box, includes a relevance engine adapted to track user viewing preferences over time and to automatically determine which of the available programs in a given time slot is the most probably preferred program. The relevance engine can then create a list of most probably preferred programs, with each entry in the list representing the program the user most probably wants to watch at that time. The MPD can then provide a personalized multimedia channel (PMC), which plays the most probably preferred program for each time slot, and includes the PMC in the EPG. The MPD enables users to "tune" to the PMC like any other channel. When users tune to the PMC, the MPD will take the appropriate action to display the program selected by the relevance engine. For example, given a system such as cable or satellite, where a multiplexed signal includes a plurality of available programs, selecting the PMC may cause the MPD to tune to the actual channel providing the most probably preferred program selected by the relevance engine. In IPTV systems, selecting the PMC may cause the end-user device to request and stream the most probably preferred program. In each of these systems, the PMC enables users to select the most probably preferred program at any time by simply selecting the PMC.

In another aspect, a disclosed MPD may collect additional data to determine a user's preferences. For example, the MPD may allow a user to accept or reject programs presented by the PMC. If a user rejects a program, the PMC could then display the program it computes to be the next-most-probable choice. This sort of direct, targeted feedback would provide additional data for the relevance engine to work with. In yet another aspect, the MPD may allow a user to manually enter specific preferences. For example, a user might enter the names of preferred actors or actresses, preferred directors, preferred genres, preferred program lengths, or preferred formats and corresponding dislikes. The relevance engine could incorporate the explicitly indicated preferences and dislike to provide further guidance for identifying most probably preferred programs.

Embodiments of a PMC will now be described with particular reference to the enclosed figures.

Figure 1:
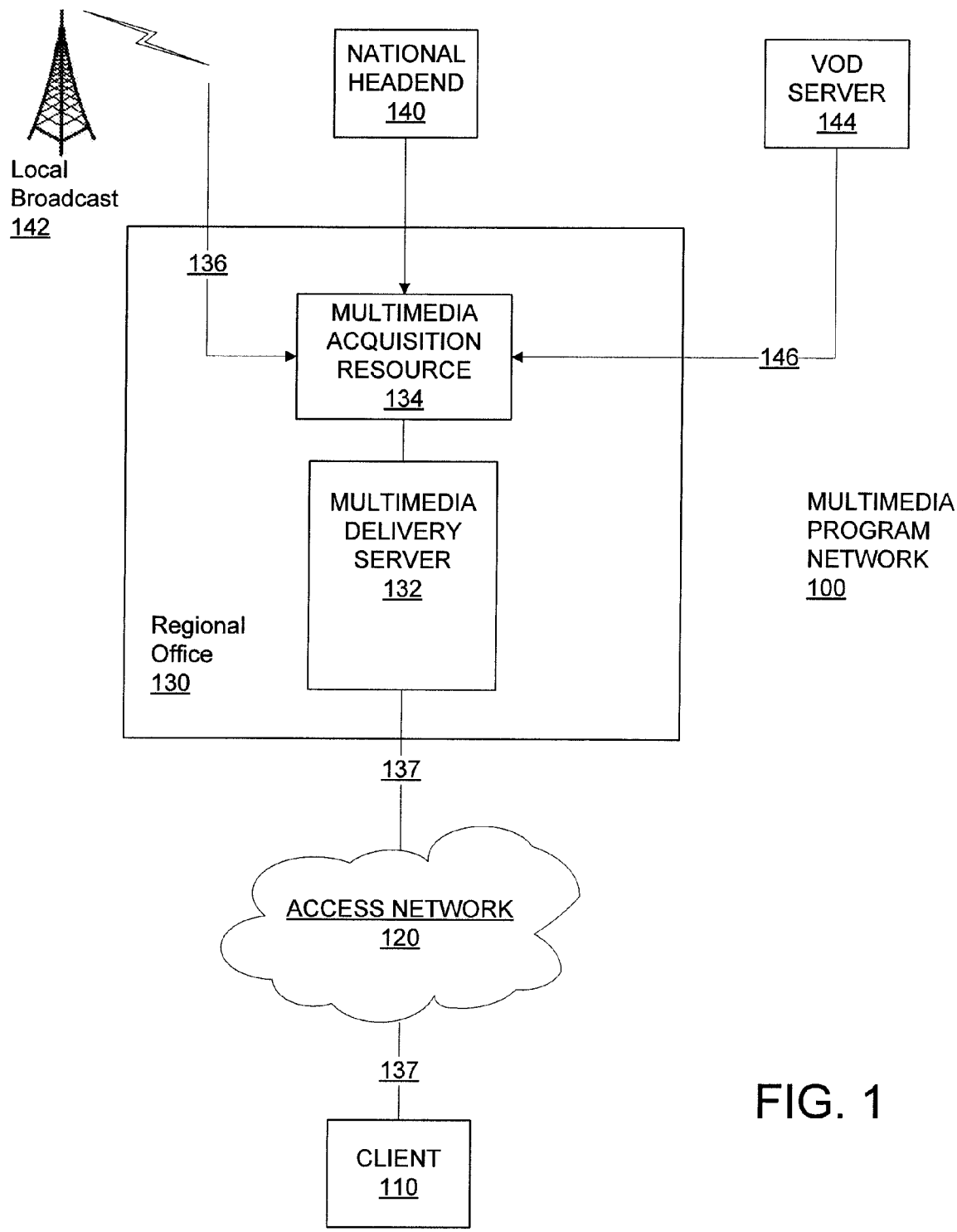
FIG. 1 is a block diagram of selected elements of an embodiment of a multimedia program network.

Turning to FIG. 1, selected elements of an embodiment of a multimedia program network 100 are depicted. Multimedia program network 100 includes a client 110 connected to a regional office 130 of a multimedia service provider through an access network 120. In the depicted embodiment, regional office 130 includes a multimedia acquisition resource 134 that acquires multimedia content from a plurality of sources. These sources may include a local broadcast 142, a national headend 140, and a VOD server 144. Multimedia content acquired by acquisition resources 134 is provided to multimedia delivery server 132, which may select content for delivery to client 110 and process and/or format the content for transmission over access network 120. In some instances, content processing performed by multimedia delivery server 132 may including encoding a multimedia stream received from multimedia acquisition resource 134 to compress, encrypt, or compress and encrypt the content. In other cases, the stream received from multimedia acquisition resources 134 may be in an encoded form as it is sent to multimedia delivery server 132. Multimedia delivery server 132 then transmits the encoded programming stream 137 to a client 110 via access network 120. In IPTV networks, access network 120 may include unshielded twisted pair cabling, fiber optic cabling, a combination thereof, or another suitable medium. In cable-based systems, access network 120 may include coaxial cabling.

Figure 2:
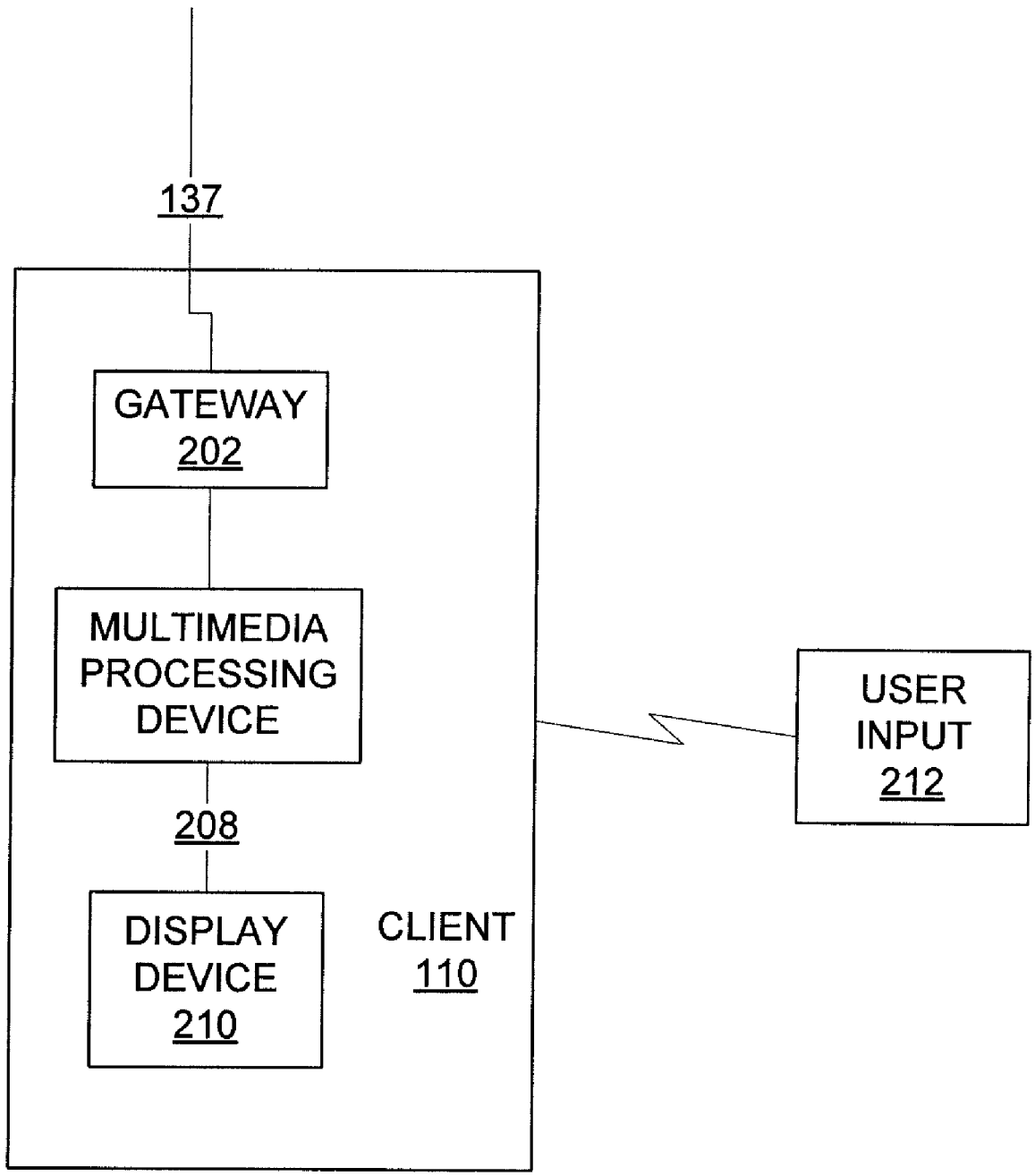
FIG. 2 is a block diagram of selected elements of an embodiment of client-side equipment for use with a multimedia program network.

Turning to FIG. 2, there is shown a block diagram of selected elements of an embodiment of a client 110. A gateway 202 interfaces the client 110 to the access network 120 (FIG. 1) to receive programming stream 137. Gateway 102 may include firewall functionality, routing functionality, network address translation functionality, or a combination thereof. Gateway 202 may implemented within a conventional broadband modem, a wireless or wireline router, or elsewhere. Gateway 102 may include a network protocol stack and may perform at least some network protocol processing of programming stream 137 in Internet Protocol (IP) or other packet switched embodiments of access network 120. A multimedia processing device (MPD) 206 receives multimedia data from the gateway 202 and also receives user input 212 from, for example, a remote control device or a front panel button. MPD 206 may filter and/or decode content contained in the multimedia data provided by the gateway 202 and then transmit the selected content 208 to the display device 210.

Figure 3:
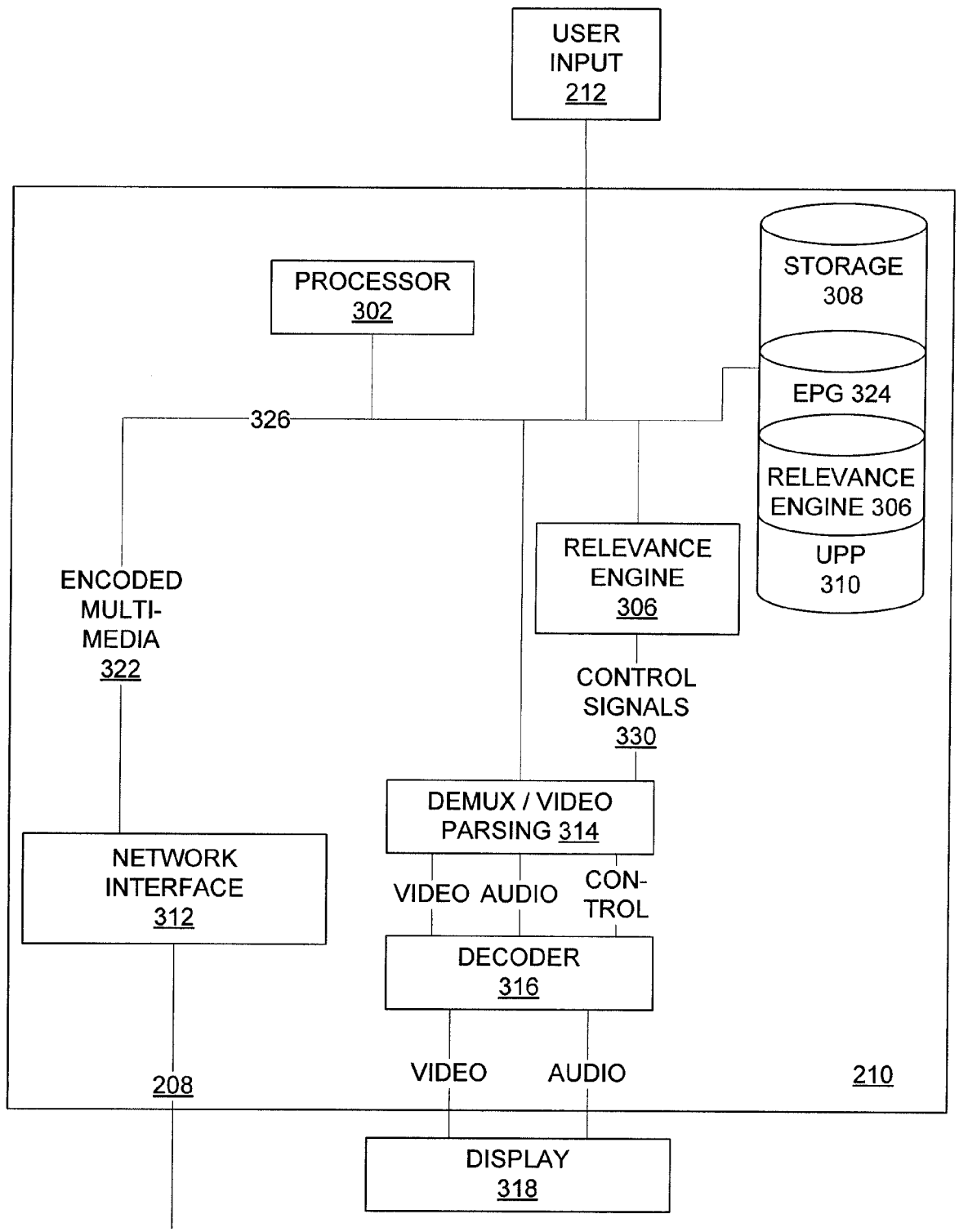
FIG. 3 is a block diagram of selected elements of an embodiment of a multimedia processing device suitable for providing a personalized multimedia channel for use with a multimedia program network.
Figure 4:
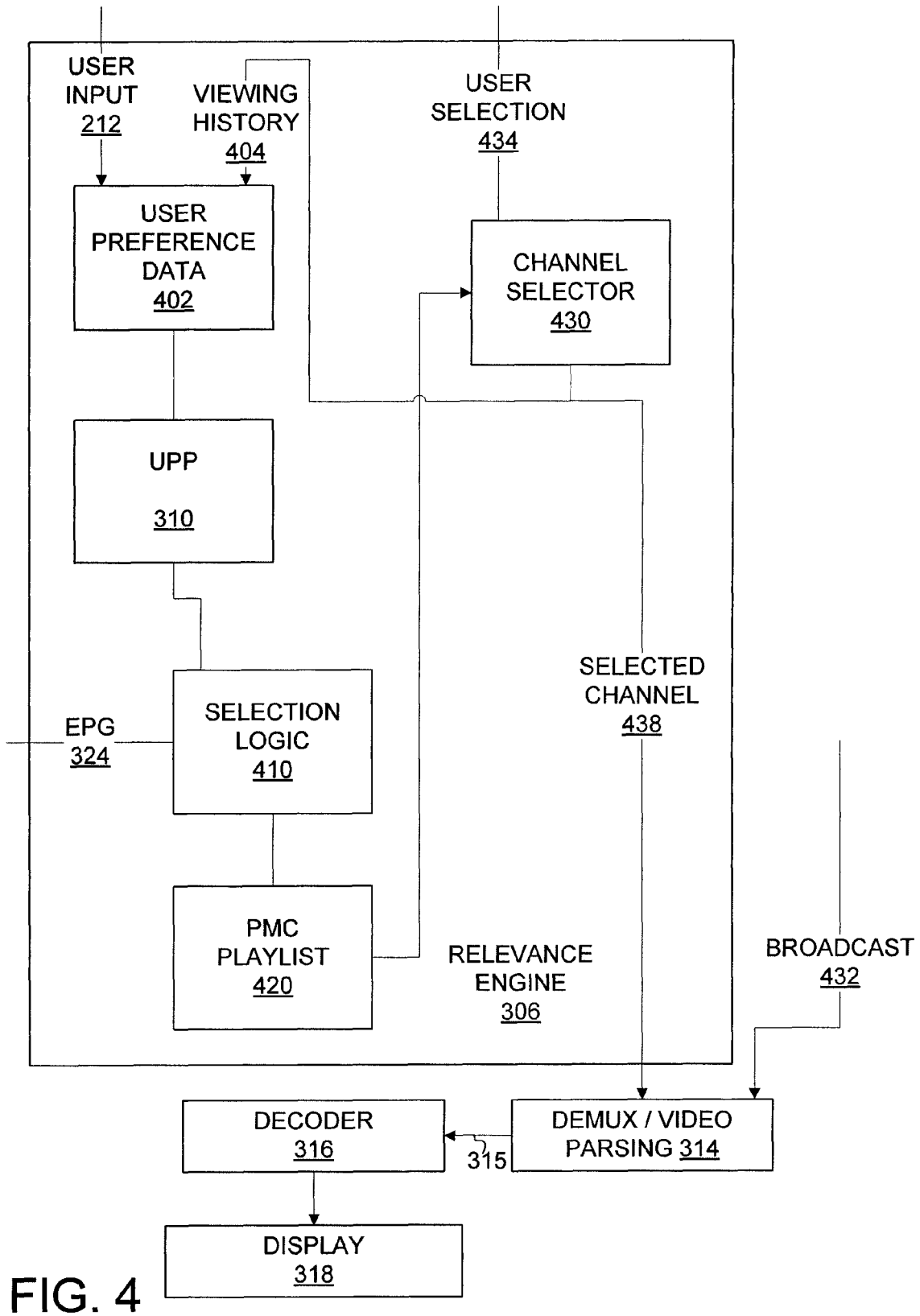
FIG. 4 is a block diagram selected elements of an embodiment of a relevance engine for use with a broadcast network.

Turning to FIG. 3, a block diagram of selected elements of an embodiment of MPD 210 is depicted. The depicted embodiment of MPD 210 includes a network interface 312 that receives a multimedia data stream 208 that has been transmitted by gateway 202 (FIG. 2). The network interface 312 may separate the multimedia data stream 208 into encoded multimedia data 322, which is provided on a system bus 326. Processor 302 provides programmable logic and may be a micro-processor, central processing unit, application-specific integrated circuit, or other programmable processing device. Processor 302 is communicatively coupled to storage 308 which includes a stored user preference profile (UPP) 310 and EPG data 324 and computer executable instructions that implement a relevance engine 306. The UPP 310 may be provided to the relevance engine 306 along with EPG data 324. The relevance engine 306 may be adapted to be responsive to user input and to compare the UPP 310 to EPG data 324 to create a PMC play list 420 (FIG. 4). Demux/video parsing unit 314 receives encoded multimedia stream 322 and provides an encoded video stream, an encoded audio stream, and control data to decoder 316. Decoder 316 converts the encoded streams to a native NTSC or PAL format. The decoder 316 then provides the decoded stream to display 318. MPD 210 may include at least some elements of a set top box.

Turning to FIG. 4, there is shown a block diagram of selected elements of an embodiment of a relevance engine 306. User inputs 212 and user viewing history 404 may be provided to form user preference data 402. The user preference data 402 are then used to form or update a UPP 310. The UPP 310 is provided to selection logic 410 which also receives EPG data 324. The selection logic 410 may operate on a number of discrete time slots. For each discrete time slots, the selection logic 410 will compare the UPP 310 to the available programs for that time slot as described by the EPG data 324, and may determine which of the available programs for that time slot is most probably desired by the user. These selections are then used to form a PMC play list 420. PMC play list 420 is provided to a channel selector 430 which also receives a user selection 434. The channel selector 430 may determine whether the PMC has been selected by the user, and if so, then channel selector 430 will provide the PMC as selected channel 438. If the PMC has not been selected but instead the user has selected a different channel, then that channel will be provided as the selected channel 438. The selected channel 438 is provided to demux/video parsing unit 314. In some embodiments, such as cable and satellite, demux/video parsing 314 receives a broadcast 432 that includes a plurality of channels that must be tuned. In these embodiments, demux/video parsing unit 314 then uses selected channel 438 to tune the selected content from out of the broadcast 432 and provide selected content 315 to decoder 316. The decoder decodes the selected content 315 and provides it to the display 318.

Figure 5:
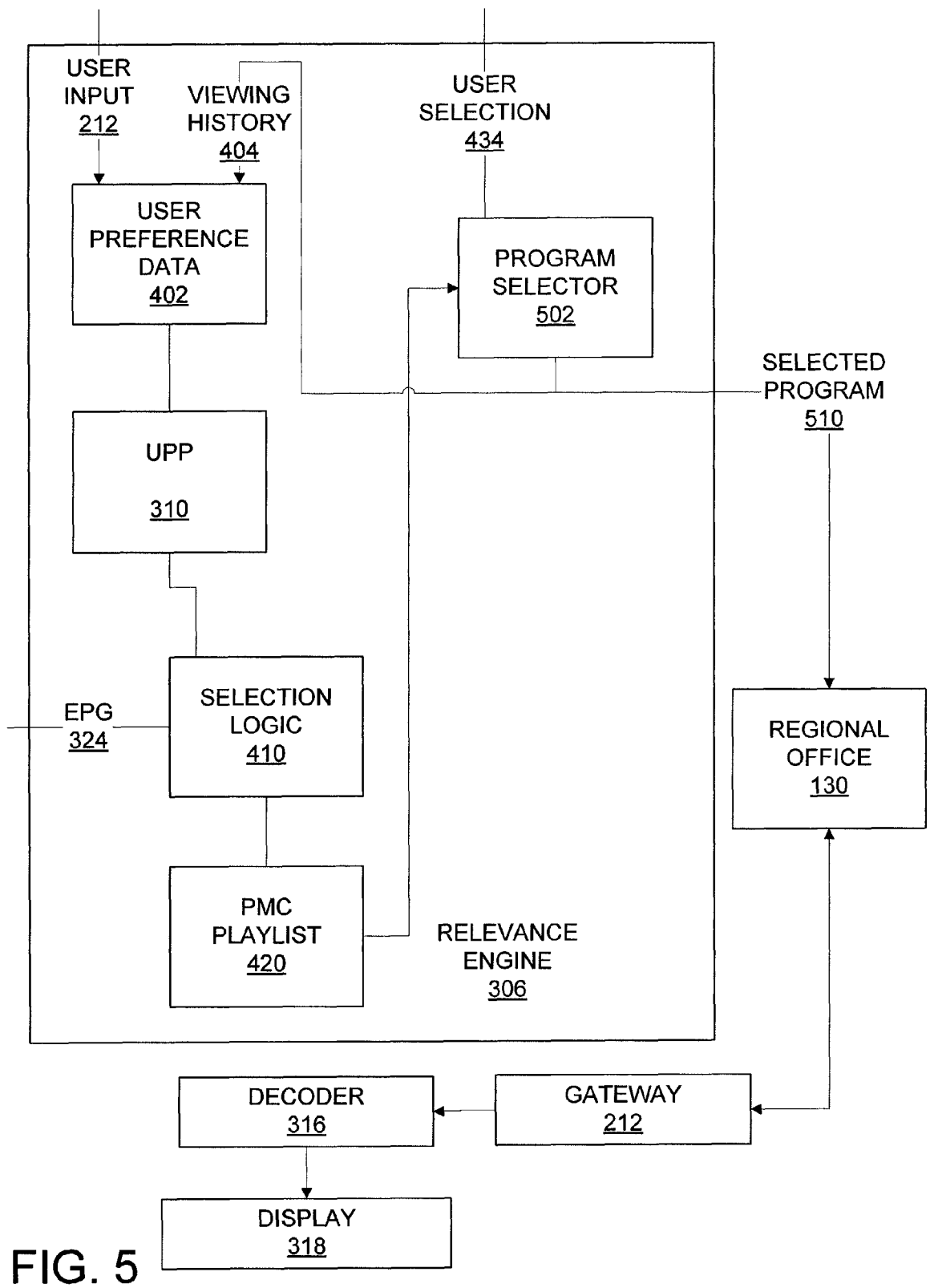
FIG. 5 is a block diagram selected elements of an embodiment of a relevance engine for use with a video-on-demand network.

Turning to FIG. 5, there is shown another embodiment of a relevance engine 306 adapted for use with an IPTV embodiment. This embodiment of relevance engine 306 varies from FIG. 4 in that rather than receiving a consolidated stream with a plurality of programs and requiring the device to tune out all but the selected program, in this embodiment a specific program is selected, and only the selected program is provided over the network. So in this embodiment, relevance engine 306 includes a program selector 502 rather than a channel selector 430. The program selector 502 works similarly to the channel selector 430. The program selector 502 will receive user selection 434 and determine whether to provide a manually selected program or to provide the program determined by the PMC play list 420. The program selector 502 then outputs the selected program signal 510, which is then provided to regional office 130 (FIG. 1) via access network 120 to the IPTV or VOD gateway 212. The regional office 130 then streams the selected program over access network 120 and to the gateway 212. Gateway 212 provides the encoded multimedia stream to decoder 316. Decoder 316 decodes the program into a native format and provides the decoded stream to the display 318.

Figure 6:
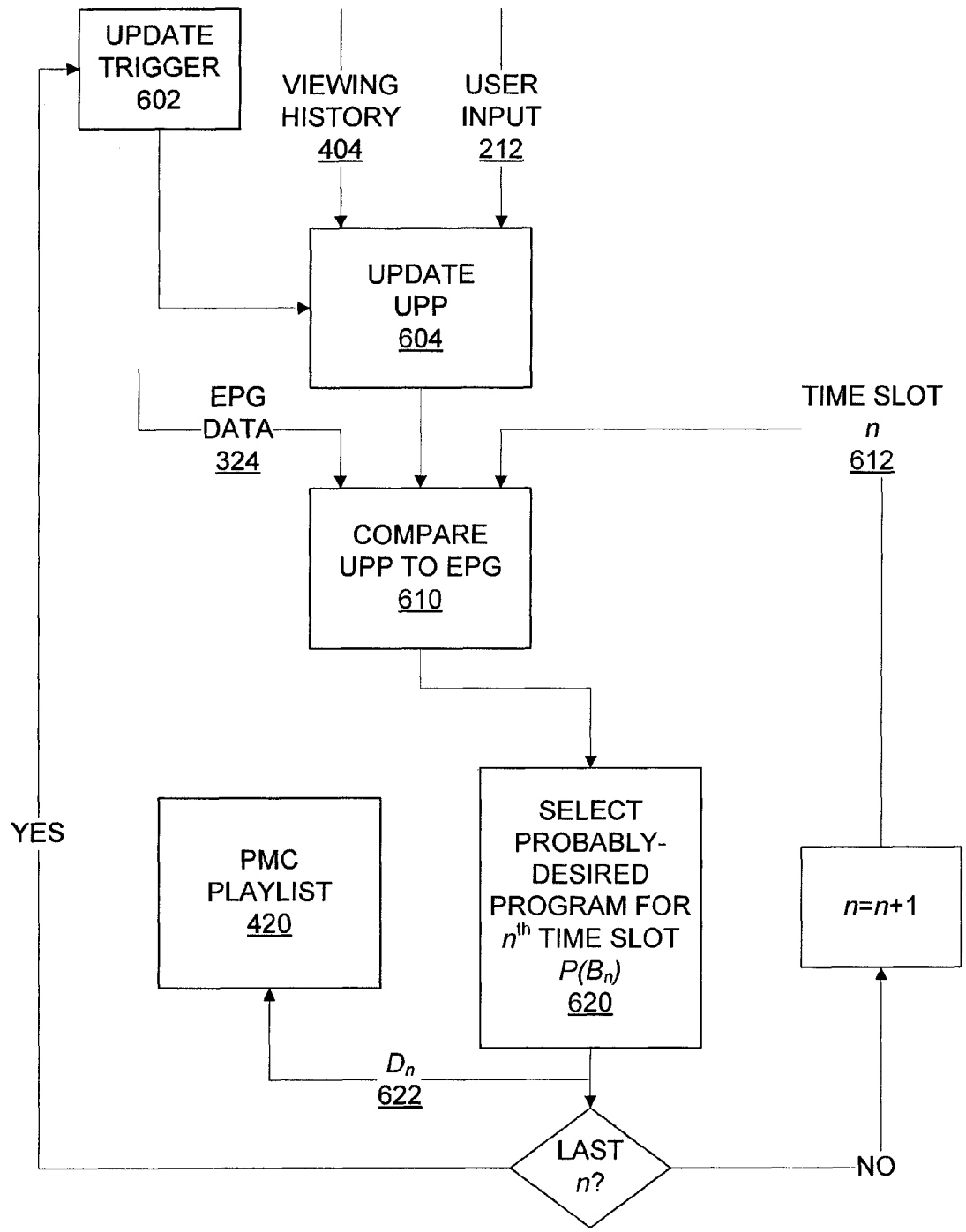
FIG. 6 is a block diagram showing a process for creating a play list for use in a personalized multimedia channel.

Turning to FIG. 6, there is shown a flow-chart of selected elements of the operation of an embodiment of a relevance engine 306. The depicted embodiment of relevance engine 306 is responsive to an update trigger 602. The update trigger may include any event that requires the UPP to be updated. For example, update triggers may include a user entering manual input, the user manually selecting a program from the EPG, a user accepting a program provided by the PMC, a user rejecting a program provided by the PMC, a program beginning or ending, or a fixed time interval. When an update trigger 602 occurs, the relevance engine 306 updates the UPP 310 as shown in step 604. Step 604 may receive as an input a viewing history 404 and user input 212. After the UPP 310 has been updated, the relevance engine 306 compares the UPP 310 to EPG data 324 in step 610. This process receives as input the updated UPP 310 and EPG data 324. In some embodiments, step 610 will operate on a discrete timeslot, designated as time slot n 612. This provides for an iterative update wherein a PMC play list 420 can be generated for a plurality of consecutive or non-consecutive timeslots. After comparing the UPP 310 to EPG data 324, there is a process 620 of selecting a probably-desired program for the $n^{th}$ timeslot. This is designated as $P(B_n)$. This notation represents the probability that $B_n$, which may represent a single available program, is the desired program for its time slot. After the probably-desired program has been selected in 620, then the PMC play list is updated as in 420 by receiving $D_n$ 622, which represents the probably-desired program for timeslot n. There is also a check to see if the last n has been reached, if not, then n is incremented and a new time slot n 612 is delivered to step 610, wherein the UPP to EPG comparison again takes place. If the last n has been reached, then the relevance engine 306 again waits for an update trigger.

The calculation of $P(B_n)$ may be accomplished using a number of mathematical or logical processes. By way of non-limiting illustration, a number of possible processes are herein described. In one example, $P(B_n)$ may be computed with a simple comparison process. This may involve reading preference fields from the UPP 310 and comparing them to corresponding fields from EPG data 324. The comparison may be a simple Boolean operation, yielding a 1 for a match and a 0 for a non-match. For each program, the values for the several fields can be added, yielding a profile for the total number of matches in any given program. In alternative embodiments, certain fields may be more heavily weighted. For example, if a user indicates, directly or through viewing history, that actors are more important than running time, the actor field may be more heavily weighted than the running time field. In another alternative embodiment, certain values within a field may be more heavily weighted. For example, if a user indicates, directly or through viewing history, a prioritized list of preferred actors, the actor at the top of the list may be weighted more heavily than the actors at the bottom of the list.

In yet another exemplary embodiment, a mathematical probability function may be used to calculate the probability that a particular program is desired. In this case, a conditional probability function may be appropriate. Conditional probability may be expressed generically by the following equation:

$$P[A \mid B] = \frac{P[A \cap B]}{P[B]}; \quad P[B] > 0.$$

This equation calculates the probability of A, given B. For example, A may represent the probability that a particular program is desired, and B may represent any number of variables, such as a certain program has been selected previously, a user has accepted a certain program, a user has rejected a certain program, a user has manually entered a certain preference, or some other variable. The probability of A then is calculated by computing the probability of the intersection of A and B, divided by the probability of B alone, assuming that B is not zero.

A special form of a conditional probability function that may also be useful is given by Bayes' Rule. This may be expressed in the form:

$$P[B_j \mid A] = \frac{P[A \mid B_j]P[B_j]}{\sum_{k=1}^{n} P[A \mid B_k]P[B_k]}.$$

Bayes' Rule, also sometimes called the Beysian probability function, is useful when the probability of $B_j$ may be a partition of a sample space S. For each $B_j$ there is an a priori probability, representing the natural probability. For example, in the present specification, the a priori probability that a program is desired may be equal for all programs of a given time slot. Bayes' Rule then allows for an a posteriori computation of the probability, given that A has occurred. In this case, A may be any of the variables describe for B above. In this sense, the application of Bayes' rule may be similar to its use in many modern "spam" filters, which compute that probability that a given message is spam based on its similarity to other messages marked as "spam" or "not spam" in the past.

While the disclosed subject matter is described in connection with one or more embodiments, it is not intended to limit the scope of the claims to the particular embodiments set forth. On the contrary, the claims are intended to cover alternatives, modifications and equivalents that would occur to one or ordinary skill in the applicable field of endeavor having the benefit of this disclosure.

What is claimed is:

1. A method of providing a personalized channel service via a multimedia program network, the method comprising:
    configuring a multimedia processing device to receive time slot information for a plurality of multimedia content programs available via the multimedia program network; and
    configuring the multimedia processing device to:
        select, from the plurality of multimedia content programs, a most probably-desired program for a given time slot based at least in part on a user preference profile and the time slot information;
        respond to a user selecting a user preference channel during the given time slot by:
            sending a transmission request for the most probably-desired program for the given time slot to the multimedia program network; and
            responsive to receiving the most probably-desired program, streaming the most probably-desired program over the user preference channel; and
        respond to a request for a programming guide by presenting an electronic programming guide, wherein the electronic programming guide includes a plurality of time slots and an entry for the user preference channel, and wherein the user preference channel indicates most probably-desired programs selected from other channels included in the electronic programming guide for each of the plurality of time slots.

2. The method of claim 1 wherein the multimedia processing device receives metadata corresponding to the plurality of multimedia content programs, and wherein selecting the most probably-desired program includes:
    comparing the metadata to the user preference profile.

3. The method of claim 2 wherein:
    the user preference profile includes user preferred values for a plurality of fields; and
    the multimedia processing device determines the most probably-desired program by a process including:
        parsing the metadata to identify metadata information corresponding to a specific field selected from the plurality of fields; and
        comparing a user-preferred value of the specific field in the user preference profile to the metadata information.

4. The method of claim 3 wherein the specific field is selected from a genre field, an actor field, an actress field, a running time field, and a director field.

5. The method of claim 2 wherein the multimedia processing device selects the most probably-desired program based on a probability function.

6. A personalized multimedia content processing device comprising:
    a processor configured to implement a relevance engine; and
    a network interface communicatively coupling the processor to a multimedia program network;
    wherein the relevance engine is configured to:
        generate user preference ratings for a plurality of multimedia content programs available from a multimedia content distribution network; and
        based upon the user preference ratings, identify a most probably-desired program for a given time slot;
    wherein the processor is further configured to:
        send a request to a regional office of the multimedia program network for transmission of the most probably-desired program for the given time slot;
        respond to receiving a transmission stream comprising the most probably-desired program from the regional office by streaming the most probably-desired program responsive to a user selecting a user preference channel during the given time slot; and
        present an electronic program guide, including an entry for the user preference channel, responsive to the user requesting a programming guide, wherein the entry for the user preference channel identifies most probably-desired programs selected from other channels included in the electronic programming guide corresponding to a plurality of time slots.

7. The device of claim 6, wherein the relevance engine is configured to generate the user preference ratings based at least in part on a user preference profile stored in storage accessible to the processor.

8. The device of claim 7 wherein the relevance engine is further configured to receive feedback and to update the user preference profile in response.

9. The device of claim 7 wherein the relevance engine is configured to generate the user preference ratings by comparing values selected from the user preference profile to values selected from metadata associated with the multimedia content programs.

10. The device of claim 6 wherein the relevance engine is configured to generate the user preference ratings based on a probability function.

11. The device of claim 10 wherein the probability function is a conditional probability function of a form:

$$P[A \mid B] = \frac{P[A \cap B]}{P[B]}; \quad P[B] > 0.$$

12. The device of claim 10 wherein the probability function is a Bayesian function of a form:

$$P[B_j \mid A] = \frac{P[A \mid B_j]P[B_j]}{\sum_{k=1}^{n} P[A \mid B_k]P[B_k]}.$$

13. The device of claim 7 wherein the relevance engine is configured to generate the user preference ratings based at least in part on a program viewing history of the user.

14. A non-transitory computer-readable medium storing program instructions for providing a personalized channel to a user of a multimedia program network, the program instructions, when executed by a processor, performing operations to:
  access electronic programming guide data identifying programming available via the multimedia program network;
  generate an electronic programming guide display including channels and time slots, wherein the channels include a user preference channel that indicates most probably-desired programs selected from other channels included in the electronic programming guide display for at least some of the time slots and wherein the most probably-desired programs are determined based at least in part on the electronic programming guide data and user preference data indicative of multimedia content preferences of a user; and
  respond to receiving input from the user to display the user preference channel by sending a transmission request to a regional office of the multimedia program network for the most probably-desired program for a given time slot and streaming the most-probably desired program.

15. The computer readable medium of claim 14 wherein the operations include operations to:
  receive feedback data; and
  update the user preference profile in response to the feedback data.

16. The computer readable medium of claim 14 wherein content of the user preference channel is determined by a process including:
  accessing user preference values corresponding to a set of preference types;
  parsing the electronic programming guide data to extract electronic programming guide values corresponding to the user preference values; and
  comparing the electronic programming guide values to the user preference values.

17. The computer readable medium of claim 16 wherein the set of preference types is selected from a genre type, an actor type, an actress type, a running time, and a director.

18. The computer readable medium of claim 14 wherein the most probably-desired programs are determined based on a probability function.

19. The computer readable medium of claim 18 wherein the probability function is a conditional probability function of a form:

$$P[A \mid B] = \frac{P[A \cap B]}{P[B]}; \quad P[B] > 0.$$

20. The computer readable medium of claim 18 wherein the probability function is a Bayesian function of a form:

$$P[B_j \mid A] = \frac{P[A \mid B_j]P[B_j]}{\sum_{k=1}^{n} P[A \mid B_k]P[B_k]}.$$

21. A method for providing a personalized multimedia content channel comprising:
  analyzing preference data indicative of programming preferences of a user;
  creating a user preference profile based on the programming preferences;
  accessing electronic programming guide data identifying a plurality of available programs for a given time slot;
  based on the user preference profile, selecting from the plurality of available programs a most probably-desired program for the given time slot; and
  enabling the user to access a dedicated channel providing most probably-desired programs for a plurality of time slots, wherein enabling the user to access the dedicated channel comprises:
    responsive to receiving a user request for the dedicated channel, sending a transmission request for the most probably-desired program for the given time slot to a regional office of a multimedia program network providing the plurality of available programs; and
    streaming the most probably-desired program for the given time slot from the regional office.

22. The method of claim 21 further comprising:
  collecting feedback data; and
  updating the user preference profile based on the feedback data.

23. The method of claim 21 wherein the selecting of the most probably-desired program includes performing a pattern-matching process.

24. The method of claim 23 wherein the pattern-matching process matches a value selected from the electronic programming guide data to a value representing a preference for a program feature selected from a genre, an actor, an actress, a running time, and a director.

25. The method of claim 21 wherein the selecting of the most probably-desired program is based on a probability function.

26. The method of claim 25 wherein the probability function is a conditional probability function.

27. The method of claim 21 wherein the analyzing of preference data includes analyzing manual input from the user.

28. The method of claim 21 wherein the analyzing of preference data includes analyzing information indicative of a program viewing history of the user.

* * * * *